United States Patent
Wang et al.

(10) Patent No.: US 6,221,142 B1
(45) Date of Patent: Apr. 24, 2001

(54) SUPERIOR WATERFASTNESS AND BLEED CONTROL WITH SPECIFICALLY TREATED PIGMENTS FOR INK-JET PRINTING

(75) Inventors: Patricia A. Wang; David J. Halko, both of Corvallis, OR (US); Ronald J. Gambale, Wakefield; Robert M. Amici, Berlin, both of MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/415,559

(22) Filed: Oct. 8, 1999

Related U.S. Application Data

(60) Provisional application No. 60/140,290, filed on Jun. 18, 1999.

(51) Int. Cl.[7] ............................. C09D 11/02; C09C 1/48
(52) U.S. Cl. ............... 106/31.6; 106/31.85; 106/472; 106/473; 106/476; 106/478; 106/499; 106/505
(58) Field of Search .......................... 106/31.6, 31.85, 106/472, 473, 476, 478, 499, 505

(56) References Cited

U.S. PATENT DOCUMENTS

| 5,630,868 | 5/1997 | Belmont et al. ............. 106/31.75 |
| 5,707,432 | 1/1998 | Adams et al. ............... 106/31.6 |
| 5,803,959 | * 9/1998 | Johnson et al. ............. 106/31.75 |
| 5,837,045 | * 11/1998 | Johnson et al. ............. 106/31.85 |
| 5,851,280 | * 12/1998 | Belmont et al. ............. 106/472 |
| 5,922,118 | 7/1999 | Johnson et al. ............. 106/31.6 |
| 6,069,190 | * 5/2000 | Bates et al. ................. 523/161 |

FOREIGN PATENT DOCUMENTS

| 0913438A1 | 5/1999 | (EP) | C09D/11/00 |
| 0688836B1 | 9/1999 | (EP) | C09D/11/02 |
| 2 323 600 | 9/1998 | (GB) | C09C/1/56 |
| WO97/47697 | 12/1997 | (WO) | C09D/11/00 |
| WO97/48769 | 12/1997 | (WO) | C09B/67/22 |

\* cited by examiner

*Primary Examiner*—Helene Klemanski
(74) *Attorney, Agent, or Firm*—Michael D. Jones

(57) ABSTRACT

The ink of the invention comprises a vehicle and a colorant. The colorant is a water-insoluble pigment that has been chemically modified to be water dispersable by addition of functional groups to the surface of the pigment resulting in water soluble colorant particles. The performance of these pigments is improved by the addition of specific functional groups which provide improved black to color bleed control and high waterfastness.

20 Claims, No Drawings

SUPERIOR WATERFASTNESS AND BLEED CONTROL WITH SPECIFICALLY TREATED PIGMENTS FOR INK-JET PRINTING

CROSS REFERENCE TO RELATED APPLICATIONS

This patent application is claims back to provisionally filed U.S. patent application Ser. No. 60/140,290, filed Jun. 18, 1999.

TECHNICAL FIELD

The present invention relates to ink-jet compositions for inkjet printers, including thermal inkjet, piezoelectric inkjet, drop on demand, and continuous printing applications for home, office, large format printers, and textile printers.

BACKGROUND ART

Ink-jet printing is a non-impact printing process in which droplets of ink are deposited on print media, such as paper, transparency film, or textiles. Low cost and high quality of the output, combined with relatively noise-free operation, have made ink-jet printers a popular alternative to other types of printers used with computers. Essentially, ink-jet printing involves the ejection of fine droplets of ink onto print media in response to electrical signals generated by a microprocessor.

There are two basic means currently available for achieving ink droplet ejection in ink-jet printing: thermally and piezoelectrically. In thermal ink-jet printing, the energy for drop ejection is generated by electrically-heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor. The ejection of ink droplets in a particular order forms alphanumeric characters, area fills, and other patterns on the print medium.

Inks useful in ink-jet printing are typically composed of either pigments or dyes. Pigments are very small insoluble solid colorant particles wherein the molecules are strongly associated with one another through intermolecular forces such as Van der Waals attraction, pi-pi interactions or hydrogen bonding. These forces of attraction prevent solvation of the molecules by common solvents such that they cannot form solutions like their dye counter-parts. Conventionally, pigments are used in printing inks by suspending them in a liquid medium using a high-energy dispersion process with the aid of dispersing agents. One disadvantage of using pigments is that their dispersions are inherently thermodynamically unstable and eventually the pigment particles agglomerate to larger particles that tend to settle. Moreover, pigments lead to the inks taking a relatively long time to dry on the media, which in turn leads to increased opportunity for the ink to run or smear when subjected to moisture or water; the degree of water resistance is called "waterfastness". Further, the tendency of one color of ink to run into the adjacent color is know at "bleed". This is most apparent with black ink bleeding into color inks. Several methods have been employed by ink formulators to achieve bleed control to varying degrees of success. Many pigmented inks possess one or more of the foregoing properties. However, few ink compositions possess all of those properties, since an improvement in one property often results in the degradation of another. Thus, inks used commercially represent a compromise in an attempt to achieve a pigmented ink evidencing at least an adequate dispersibility and performance in each of the aforementioned properties.

Accordingly, investigations continue into developing ink formulations that have both good dispersibility and improved properties such as improved bleed control and good waterfastness all without sacrificing performance in other necessary properties.

DISCLOSURE OF INVENTION

In accordance with the invention, inks used in ink-jet printing are provided wherein the black to color bleed and water resistance of the inks are improved through the use of an ink which contains a vehicle and at least one colorant where the colorant comprises pigment particles (preferably carbon black), wherein the surface has been treated with a combination of dispersing groups and specific functional groups. This treatment results in water-dispersibility and improved print properties of the pigmented ink.

Additionally, methods of ink-jet printing that use the disclosed inks and exploits the ink's properties are provided.

In the practice of the present invention, specific functional groups are applied to a colorant particle with a useful mean diameter ranging from 0.005 to 10 $\mu$m. If the colorant particles are larger than this, they do not remain in solution well enough to be useful in the practice of this invention. Likewise, if the colorant particles are too small, they lack the appropriate properties to be useful in this invention. Colorants of this type result from chemical reactions where the colorant particles are derivatized with solubilizing groups that render the colorant dispersible in water. This resulting functionalized pigment is water-dispersible, with stability being similar to that of well known and commercially used water-soluble acidic and basic dyes.

Examples of water-dispersible black chromophores (or pigments) suitable for use herein are made from commercially available pigments obtained from colorant vendors such as Cabot Corp. Although many base pigments are useful in the practice of this invention, the following pigments comprise a partial list of useful base colorants in this invention; however, this listing is not intended to limit the invention. Base Cabot pigments would include Monarch® 1400, Monarch® 1300, Monarch® 1100, Monarch® 1000, Monarch® 900, Monarch® 880, Monarch® 800, and Monarch® 700, Cab-O-Jet® 200 and Cab-O-Jet® 300. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S170, Special Black 6, Special Black 5, Special Black 4A, Special Black 4, Printex U, Printex 140U, Printex V, and Printex 140V. Tipure® R-101 is available from DuPont.

Modification imparting Water-dispersibility The base pigments are modified by the addition of one or more organic compounds comprising at least one aromatic hydrocarbon or a C1–C12 alkyl hydrocarbon and at least one ionic group or ionizable group. The ionizable group is one that forms ionic groups in an aqueous medium. The ionic group may be anionic or cationic. The aromatic hydrocarbon may be further substituted or unsubstituted. Examples include phenyl or a napthyl groups with the ionic group being sulfonate, sulfinate, phosphonate, or carboxylate.

Depending on the process selected, the pigment particles can either be anionic or cationic in character. As commercially available, the anionic chromophores are usually associated with sodium or potassium cations, and the cation chromophores are usually associated with chloride, nitrate, or sulfate anions.

For modification, one preferred method is treatment of the carbon black pigment with aryl diazonium salts prepared from aromatic compounds containing at least one acidic functional group. Examples of aryl diazonium salts include those prepared from sulfanilic acid, 4-aminobenzoic acid, 4-aminosalicylic acid, 7-amino-4-hydroxy-2-naphthlenesulfonic acid, aminophenylboronic acid, aminophenylphosphonic acid, 12-aminododecanoic acid and metanilic acid.

Preferred structures that provide desired functional groups (Group I) which are attached to the pigment surface and allow for the self-dispersing characteristics of the colorants of this invention include, but are not limited to:

Group I

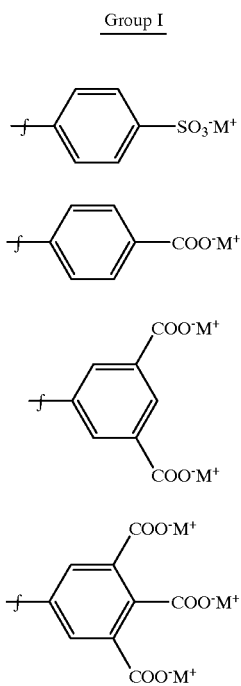

wherein $M^+$ can be $Na^+$, $Li^+$, $K^+$, $NH_4^+$, tetramethylammonium $((CH_3)_4N^+)$, and trimethylammonium $((CH_3)_3NH^+)$ cations, although any suitable counterion may be used herein. These are abbreviated as BSA (benzene sulfonic acid, Ia), BA (benzoic acid, Ib), ISO (isophthalic acid, Ic) and TRI (1,2,3-benzenetricarboxylicacid, Id).

Modifications Imparting Bleed Control and Waterfastness. The structures which provide functional groups (Group II) which impart bleed control and waterfastness include:

Group II

|—$R_1COO^-M^+$       IIa

|—Ar—$CONHR_1COO^-M^+$       IIb and mixtures thereof; wherein Ar is an aryl group; $M^+$ can be $H^+$, $Na^+$, $Li^+$, $K^+$, $NH_4^+$, tetramethylammonium $((CH_3)_4N^+)$, and trimethylammonium $((CH_3)_3NH^+)$ cations, although any suitable counterion may be used herein; $R_1$ can be from about 5 to about 20 carbons; $R_1$ is preferably from about 6 to about 18 carbons. $R_1$ can be branched or unbranched and contain ionic or nonionic substituents. Preferred $R_1$ groups include n-$C_5H_{10}$ (n-hexanoic, abbreviated as HA) and n-$C_{11}H_{22}$ (n-dodecanoic, abbreviated as DA).

Although any method known to those skilled in the art can be used to attach these functional groups, one method begins with a ratio of Group I:Group II reactants at treatment levels of from about 0.3:1.4 to about 1.0:0.1 mmol/g pigment. Preferably, the ratio of starting reactants Group I:Group II is from about 0.5:0.5 to about 0.80:1.4. For example, good results are found when the starting reactants providing for the BA group to the Group II wherein $R_1$, is DA, BA/GroupII-DA, is 0.3/1.4, preferably 0.8/0.5. In yet other examples, good results are found when the starting reactants providing for the BA group to the IIb group when $R_1$, is DA, BA/IIb-DA is from about 0.8/0.1 to 0.8/0.7 and from about 0.6/0.1 to about 0.6/0.7. A preferred ratio of ISO Group I to Group II functional groups is about 0.3/0.3 mmol/g pigment-based colorant. In general, see U.S. Pat. Nos. 5,707,432; 5,630,868; 5,571,311; and 5,554,739 for a discussion of modified carbon black pigments and methods of attaching functionalized groups. The final ratio of functional groups on the pigment is based on these starting ratios and completion of the reaction themselves.

Ink-jet Ink Vehicle. The ink compositions of this invention comprise the modified pigment colorants above plus a vehicle. For a discussion of inks and their properties, see *The Printing Manual*, $5^{th}$ ed. Leach et al. (Chapman and Hall, 1993). See also U.S. Pat. Nos. 2,833,736; 3,607,813; 4,104,061; 4,770,706; and 5,026,755.

A typical formulation for an ink useful in the practice of the invention includes the functionalized pigment (about 0.001% to 10 wt %), one or more cosolvents (0.01 to about 50 wt %) and one or more water-soluble surfactants/amphiphiles (0 to about 40 wt %, preferably about 0.1 to about 5%).

One or more cosolvents may be added to the vehicle in the formulation of the ink. Classes of cosolvents employed in the practice of this invention include, but are not limited to, aliphatic alcohols, aromatic alcohols, diols, glycol ethers, poly(glycol) ethers, lactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this invention include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. The cosolvent concentration may range from about 0.01 to about 50 wt %, with about 0.1 to 20 wt % being preferred.

Water-soluble surfactants may be employed in the formulation of the vehicle of the ink. For convenience, examples of surfactants are divided into two categories: (1) non-ionic and amphoteric and (2) ionic. The former class includes: TERGITOLs, which are alkyl polyethylene oxides available from Union Carbide; TRITONs, which are alkyl phenyl polyethylene oxide surfactants available from Rohm & Haas Co.; BRIJs; PLURONICs (polyethylene oxide block copolymers); and SURFYNOLs (acetylenic polyethylene oxides available from Air Products); POE (polyethylene oxide) esters; POE diesters; POE amines; POE amides; and dimethicone copolyols. Ionic surfactants such as quaternary or protonated amines or POE amines, sulfonates, carboxylates, phosphates, phosphonates, sulfates and substituted amine oxides are useful in the practice of this invention. U.S. Pat. No. 5,106,416, discloses more fully most of the surfactants listed above. The non-ionic amphiphiles/surfactants are more preferred than the ionic surfactants. Specific examples of amphiphilies/surfactants that are preferably employed in the practice of this invention include SURFYNOL 465, Rhodacal N, Pluronic F65, Pluronic F38 and cocobetaine. The concentration of the amphiphile/surfactants may range from 0 to 40 wt %, preferably from about 0.1% to 5 wt %.

Consistent with the requirements for this invention, various types of additives may be employed in the ink to optimize the properties of the ink composition for specific applications. For example, as is well-known to those skilled in the art, biocides may be used in the ink composition to inhibit growth of microorganisms. Preferred examples of biocides include Ucarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the pigment colorants disclosed herein. For ink formulation which employ pigments having carboxylate functionalities, the pH is from about 7 to about 12. For sulfonate or cationic functionalities, the pH ranges from about 3 to about 12, preferably the pH is from about 5 to about 9. The viscosity of the final ink composition is from about 0.8 to about 8 cps, preferably from about 0.9 to about 4 cps.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing includes paper, textiles, wood, and plastic.

The inks are formulated by combining the various components of the vehicle and mixing them with the treated pigments disclosed herein.

All concentrations herein are expressed in weight percentages, unless otherwise indicated. The purity of all components is that employed in normal commercial practice for ink-jet inks. All cited documents and patents are hereby incorporated by reference.

EXAMPLES

Black inks are prepared containing 3% of the specified modified pigment having a surface area of 200 m²/g and a DBP absorption value of 122 ml/100g (Cabot Monarch® 700 pigment). The vehicle consisted of 5% Liponics EG-1 (ethoxylated glycerol), 9% 2-pyrrolidinone, 2% 1,5-pentanediol and the balance is water. The pH is adjusted with KOH to 8–9.

PRINT SAMPLE GENERATION METHOD. Print samples of formulated inks are generated using a Hewlett-Packard DeskJet® printer. The print media includes plain paper such as Gilbert Bond, Champion Datacopy, Papyrus Multicopy and Union Camp Jamestown.

WATERFASTNESS MEASUREMENT. A series of 12 parallel black lines approximately 0.1 inch wide and 0.2 inches apart are printed on a page which is then mounted on a 45-degree incline. A 0.25-mL aliquot of water is dripped at the specified time after printing from the top of the first line across all 12 lines. Waterfastness is measured by measuring the OD between the $11^{th}$ and $12^{th}$ lines. OD is measured using a MacBeth densitometer.

BLEED MEASUREMENT. Black lines approximately 0.1 inch wide and flanked by adjacent yellow boxes are printed with color ink sets. The black-color bleed is ranked using a scoring system of >8–10 (very poor), 6–8 (poor), 4–6 (moderate), 2–4 (good), 1–3 (very good) and 0–1 (excellent).

Various yellow inks are used to assess black to color bleed. A typical color ink vehicle consists of 7.5% 2-pyrrolidone, 8% 1,5-pentanediol, 7.5% ethylhydroxypropanediol (EHPD), 1–7% citric acid, 1.75% Tergitol 15-S-7, 4% β-alanine, Na-Direct Yellow 132 dye (Abs=0.12 at 1:10,000 dilution), and the balance water. This results in an ink that is buffered at pH 4.

Example I

The following example describes the preparation of a modified carbon black pigment with 0.8 mmol/g benozic acid (BA) and 1.4 mmol/g dodecanoic acid (DA). A 4 liter beaker is equipped with an overhead stirrer and hot plate. To this is charged 1500 mL of ethanol and 1500 mL of water. Then, 32.92 g (0.24 mol) of 4-aminobenzoic acid and 90.44 g (0.42 ml) of 12-aminododecanoic acid are added with stirring while heating to 50° C. At 50° C., 300 g of Monarch700™ is added. This is stirred thoroughly to ensure complete incorporation of the black. Finally, 46.95 g (0.66 mol, 97% purity) of sodium nitrite is added as a 230% aqueous solution dropwise over 30 minutes. The reaction is stirred for 5 hour at 50° C. A 1/1 solution of ethanol/water is added to maintain a constant volume. After 5 hours, the reaction mixture is allowed to cool to room temperature overnight (while stirring). This is then buchner filtered, and the filter cake is dried over 24 hours, soxhlet extracted over 16 hours, and dried at 70° C. in an oven overnight. This is redispersed and microfiltered to 1 micron. Finally, the material is diafiltered with 5 volumes of DI water and polish filtered using a 0.5 micron filter. Other modified carbon black pigment were prepared utilizing the procedure set forth above, except that the amount of treating agents is varied as indicated in the Examples.

Example II

The following table shows the improvement in waterfastness of various Group I-treated pigments by addition of Group II -dodecanoic acid (DA) functionality at specified levels. In all cases, waterfastness is markedly improved by the addition of only a slight amount of the Group II functionality. In this case, the amount of colorant transferred from a printed area to an unprinted area with water is measured in % OD (optical density) transferred, because OD of the different pigments varied.

1-Minute waterfastness on Champion Datacopy, % OD transferred

| Group I functionality | Amount of Group II functionalization | | |
|---|---|---|---|
| | 0 | 0.2 | 0.5 |
| ISO, 0.4 mmol/g | 25.8 | 1.6 | |
| ISO, 0.6 mmol/g | 25.2 | 0.8 | |
| BSA, 0.52 mmol/g | 36.4 | 1.2 | 5.5 |
| BSA, 0.72 mmol/g | 37 | 12.4 | 20.2 |

Example III

This example shows the improvement in waterfastness of one Group I treated pigment, 0.8 mmol/g BA, by functionalization with varying levels of DA. On all three papers tested, CHAMPION Datacopy, PAPYRUS Multicopy, and UNION CAMP Jamestown, waterfastness is greatly improved by functionalization with the Group II moiety. Here, optical density, OD, transferred is listed because ODs of all pigments are virtually identical.

1-Minute Waterfastness of BA (Group I) pigments, 0.8 mmol/g

| Group II Functionalization, mmol/g | 0 | 0.5 | 1 | 1.4 |
|---|---|---|---|---|
| Champion Datacopy | 66 | 1 | 18 | 12 |
| Papyrus Multicopy | 92 | 0 | 10 | 5 |
| Union Camp Jamestown | 187 | 5 | 20 | 32 |
| average of 3 papers | 115 | 2 | 16 | 16 |

Example IV

The following table shows that the amount of black-to-color bleed is lowered with dual functionalization of the 0.8 mmol/g BA pigment with DA. Bleed against three different kinds of color ink are shown. In all cases, pigments with some amount of Group II treatment bleed less than the pigment with only Group I treatment.

Average bleed against yellow inks on Champion Datacopy and Union Camp Jamestown

| DA Functionalization | 0 mmol/g | 0.2 mmol/g | 0.5 mmol/g | 1.0 mmol/g | 1.4 mmol/g |
|---|---|---|---|---|---|
| Color Ink 1 | 6.0 | 5.1 | 4.0 | | |
| Color Ink 2 | 9.5 | | | 6.5 | 8.2 |
| Color Ink 3 | 9.1 | | | 6.2 | 5.4 |

Example V

The following data shows the improvement in waterfastness when a pigment is modified by a Group II structure of type IIb, wherein $R_1$ is $C_{11}H_{22}$, and by a BA structure from Group I. The ink transferred, as measured by OD, is significantly reduced for Champion Datacopy. Positive results are found when the BA ranges from 0.6 to 0.8 and the Group II amide ranges from 0.1 to 0.7 as starting reactants with the pigment.

5-Minute waterfastness of Amide-treated BA pigments

| Pigment | Gilbert Bond | Champion Datacopy |
|---|---|---|
| 0.8 BA/0.0 Amide | 13 | 250 |
| 0.8 BA/0.7 Amide | 12 | 109 |
| 0.8 BA/0.4 Amide | 11 | 56 |
| 0.8 BA/0.2 Amide | 7 | 86 |
| 0.6 BA/0.7 Amide | 0 | 76 |
| 0.6 BA/0.4 Amide | 7 | 42 |

The following data shows the improvement in black to color bleed performance when a Group II amide derivative of 12-amino dodecanoic acid and a Group I BA group modify a pigment. In these cases, an additional bleed control additive (in the form of polymers described in U.S. patent application Ser. No. 09/183,219, filed Oct. 29, 1998) is present in the black ink, so the bleed for all inks is lower.

Bleed of Amide-treated BA pigments

| Pigment | Champion Datacopy | Unioncamp Jamestown |
|---|---|---|
| 0.8 BA/0.0 Amide | 3.3 | 2.2 |
| 0.8 BA/0.7 Amide | 1.3 | 1 |
| 0.8 BA/0.4 Amide | 1.6 | 1.1 |
| 0.8 BA/0.2 Amide | 1.2 | 1 |
| 0.7 BA/0.1 Amide | 2 | 1 |
| 0.6 BA/0.7 Amide | 2.7 | 0.9 |
| 0.6 BA/0.4 Amide | 1.5 | 0.5 |

INDUSTRIAL APPLICABILITY

The ink compositions of the invention are expected to find use in thermal or piezoelectric ink-jet inks, especially where the ink's characteristics, such as black to color bleed control and waterfastness are desired.

Thus, there has been disclosed an ink-jet ink which includes a colorant derived by treating the surface of colorant particles with specific functional groups thereon. It will be readily apparent to those skilled in this art that various changes and modifications of an obvious nature may be made, and all such changes and modifications are considered to fall within the scope of the invention.

What is claimed is:

1. An ink-jet ink for ink-jet printing which comprises:
   (a) a vehicle, and
   (b) at least one pigment-based colorant; wherein said colorant comprises a mixture of functional groups attached to the surface of said colorant to allow said colorant to be self-dispersing in water (Group I) and impart bleed control and waterfastness characteristics (Group II) to said colorant, wherein said Group II functional groups which impart bleed control and waterfastness characteristics to said colorant are selected from the group consisting of:

, IIa

, IIb and mixtures thereof;
wherein Ar is an aryl group; M⁺ is a counterion; and $R_1$ is from about 5 to about 20 carbons.

2. The ink-jet ink of claim 1, wherein said functional groups which allow said colorant to be self-dispersing in water (Group I functional groups) are selected from the group consisting of aromatic hydrocarbons with at least one ionic group or ionizable group attached, C1–C12 alkyl hydrocarbons with at least one ionic groups or ionizable group attached, and mixtures thereof.

3. The ink jet ink of claim 2, wherein said aromatic hydrocarbons are selected from the group consisting of substituted or unsubstituted phenyl, napthyl groups, and wherein said ionic groups attached to said aromatic hydrocarbon is selected from the group consisting of sulfonate, sulfinate, phosphonate, carboxylate, and mixtures thereof.

4. The ink-jet ink of claim 3, wherein said functional are selected from the group consisting of:

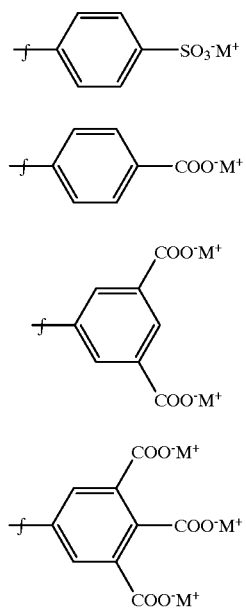

and mixtures thereof; wherein $M^+$ is a counterion.

5. The ink-jet ink of claim 1, wherein said $R_1$ is from about 6 to about 18 carbons.

6. The ink-jet ink of claim 5, wherein said $R_1$ is selected from the group consisting of n-$C_5H_{10}$, n-$C_{11}H_{22}$, and mixtures thereof.

7. The ink-jet ink of claim 2, wherein the Group I and Group II functional groups are attached based on a ratio of Group I to Group II reactants present in a starting ratio of from about 0.3:1.4 to about 1.0:0.1 mmol/g pigment-based colorant.

8. The ink-jet ink of claim 4 wherein the Group I functional group is isophthalic acid.

9. The ink-jet ink of claim 8 wherein the ratio of isophthalic acid to Group II functional groups present as reactants is about 0.3/0.3 mmol/g pigment-based colorant.

10. The ink-jet ink of claim 4 wherein the Group I functional group is benzoic acid and the $R_1$ group of the Group II functional group is $C_{11}H_{22}$.

11. The ink-jet ink of claim 10 wherein the ratio of benzoic acid to Group II functional group present as reactants is about 0.3/1.4 mmol/g pigment-based colorant.

12. The ink-jet ink of claim 11 wherein the ratio of benzoic acid to Group II functional group present as reactants is about 0.8/0.5 mmol/g pigment-based colorant.

13. The ink-jet ink of claim 7 wherein Group I is benzoic acid and the Group II functional group is IIb, wherein $R_1$ is $C_{11}H_{22}$ and wherein the range of Group I to Group II functional groups present as reactants is about 0.6 to 0.8 benzoic acid/about 0.1 to 0.7 Group II mmol/g pigment-based colorant.

14. A method of ink-jet printing comprising printing on a medium with an ink comprising:
 (a) a vehicle, and
 (b) at least one pigment-based colorant; wherein said colorant comprises a
 mixture of functional groups attached to the surface of said colorant to allow said colorant to be self-dispersing in water (Group I) and impart bleed control and waterfastness characteristics (Group II) to said colorant, wherein said Group II functional groups which impart bleed control and waterfastness characteristics to said colorant are selected from the group consisting of:

| —$R_1COO^-M^+$, | IIa |
| —Ar—$CONHR_1COO^-M^+$, | IIb | and mixtures thereof;
wherein Ar is an aryl group; $M^+$ is a counterion; and $R_1$ is from about 5 to about 20 carbons.

15. The method of claim 14, wherein said functional groups which allow said colorant to be self-dispersing in water (Group I functional groups) are selected from the group consisting of aromatic hydrocarbons with at least one ionic group or ionizable group attached, C1–C12 alkyl hydrocarbons with at least one ionic groups or ionizable group attached, and mixtures thereof.

16. The method of claim 15, wherein said aromatic hydrocarbons are selected from the group consisting of substituted or unsubstituted phenyl, napthyl groups, and wherein said ionic groups attached to said aromatic hydrocarbon is selected from the group consisting of sulfonate, sulfinate, phosphonate, carboxylate, and mixtures thereof.

17. The method of claim 16, wherein said functional are selected from the group consisting of:

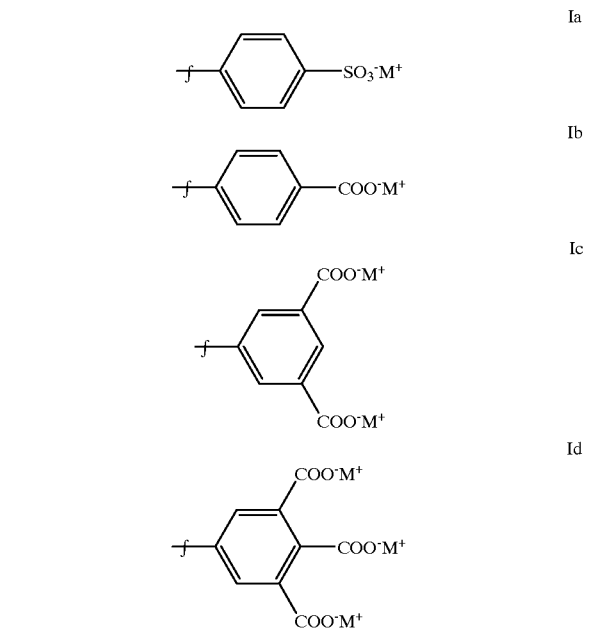

and mixtures thereof; and $M^+$ is a counterion.

18. The method of claim 14, wherein said $R_1$ is from about 6 to about 18 carbons.

19. The method of claim 14, wherein said $R_1$ is selected from the group consisting of n-$C_5H_{10}$, n-$C_{11}H_{22}$, and mixtures thereof.

20. The method of claim 17, wherein the ratio of Group I to Group II functional Groups is based on the ration of starting reactants of Group I to Group II; and wherein said starting ratio is from about 0.3:1.4 to about 1.0:0.1 mmol/g pigment-based colorant.

* * * * *